United States Patent
Fujioka et al.

(10) Patent No.: US 7,278,505 B2
(45) Date of Patent: Oct. 9, 2007

(54) CONTROL DEVICE FOR STARTING MOTION OF MOBILE BODY

(75) Inventors: Ryoji Fujioka, Kasugai (JP); Tanichi Ando, Komaki (JP)

(73) Assignee: OMRON Corporation, Kyoto (JP)

( * ) Notice: Subject to any disclaimer, the term of this patent is extended or adjusted under 35 U.S.C. 154(b) by 129 days.

(21) Appl. No.: 11/348,735

(22) Filed: Feb. 6, 2006

(65) Prior Publication Data

US 2006/0207818 A1    Sep. 21, 2006

(30) Foreign Application Priority Data

Mar. 15, 2005  (JP)  ............................. 2005-073684

(51) Int. Cl.
*B60T 7/16* (2006.01)
*B62D 1/24* (2006.01)

(52) U.S. Cl. ...................... 180/170; 180/169; 180/167; 701/301; 340/435

(58) Field of Classification Search ................ 180/167, 180/169, 170, 171, 271, 272; 340/435, 439; 701/301, 70, 96, 97
See application file for complete search history.

(56) References Cited

U.S. PATENT DOCUMENTS

| | | | |
|---|---|---|---|
| 3,898,652 A * | 8/1975 | Rashid | 342/59 |
| 4,779,095 A | 10/1988 | Guerreri | |
| 5,153,559 A * | 10/1992 | Atsumi | 340/435 |
| 6,488,109 B1 * | 12/2002 | Igaki et al. | 180/169 |
| 6,580,385 B1 | 6/2003 | Winner et al. | |
| 6,879,249 B2 * | 4/2005 | Takahashi | 340/435 |
| 7,089,114 B1 * | 8/2006 | Huang | 701/301 |
| 7,130,730 B2 * | 10/2006 | Strumolo et al. | 701/45 |

FOREIGN PATENT DOCUMENTS

| | | | |
|---|---|---|---|
| EP | 941903 | * | 1/1997 |
| EP | 1096460 | * | 9/1999 |
| GB | 2309555 | | 7/1997 |
| JP | 08329398 | * | 12/1996 |
| JP | 09002098 | * | 1/1997 |
| JP | 11-291790 | | 10/1999 |
| JP | 2000029523 | * | 1/2000 |
| JP | 2003276538 | * | 10/2003 |
| JP | 2003327045 | * | 11/2003 |
| JP | 2004133846 | * | 4/2004 |
| JP | 2004221871 | * | 8/2004 |
| JP | 2006123878 | * | 5/2006 |

* cited by examiner

*Primary Examiner*—Paul N. Dickson
*Assistant Examiner*—Bridget Avery
(74) *Attorney, Agent, or Firm*—Beyer Weaver LLP

(57) ABSTRACT

A control device is mounted to one's own mobile body such as a vehicle for controlling its starting motion. A distance measuring part measures the distance to a front going vehicle and a speed control part controls the speed of the own vehicle such that the distance to the front going vehicle will be constant based on the measured distance. A stop control part serves to detect stopping of the front going vehicle and generates a stop control signal for the own vehicle. A start control part serves to detect a start of said front going mobile body and generates a start control signal for the own vehicle. An image-taking device serves to obtain an image of the front when the front going vehicle stops and another image when it starts again. The own vehicle is inhibited from automatically starting if these two images do not match.

6 Claims, 15 Drawing Sheets

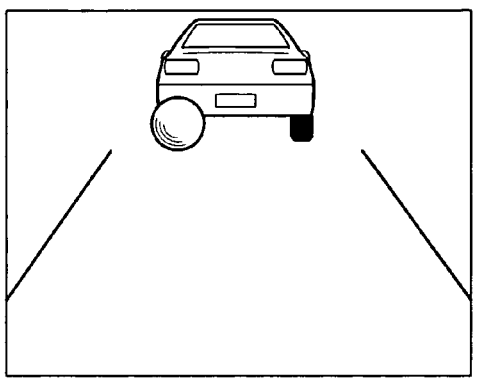 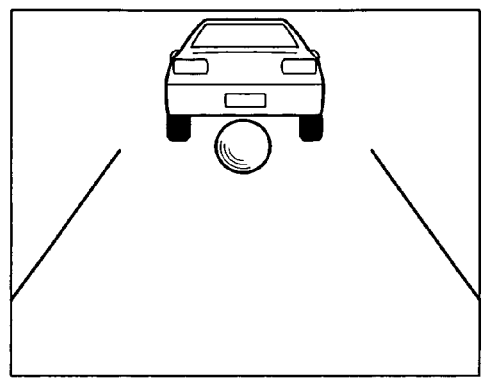
Fig. 10A                    Fig. 10B

CONTROL DEVICE FOR STARTING MOTION OF MOBILE BODY

Priority is claimed on Japanese Patent Application 2005-073684 filed Mar. 15, 2005.

BACKGROUND OF THE INVENTION

This invention relates to a control device for measuring the distance to a front going mobile body such as a motor vehicle and thereby controlling the speed of the mobile body on which it is installed such that a preliminarily specified distance can be maintained in between and more particularly to such a control device for controlling the starting motion of its own mobile body when the front going mobile body starts to move after stopping once.

The so-called adaptive cruise control (ACC) is becoming popular for moving bodies such as motor vehicles for measuring the distance to a front going vehicle by radar (whether of the optical or electromagnetic kind) and following it within a preliminarily determined maximum speed such that this separating distance can be maintained, depending on the speed. Vehicles with ACC are modernly coming to be provided with the function of stopping while maintaining a safe distance to the front going vehicle when the front going vehicle comes to stop.

From the point of view of automating the ACC, a further research is being continued for the technology of detecting the front going vehicle starting to move after once stopping and allowing its own vehicle to also start moving on the basis of the detected starting motion of the front going vehicle. If its own vehicle is allowed to start moving simply by detecting that the front going vehicle has started to move, however, an accident may result when a pedestrian or a bicyclist comes to enter the space in between while the vehicles are stopped. In view of such a possibility, Japanese Patent Publication Tokkai 2001-76299 discloses a technology of using a radar system to detect the presence of a pedestrian or a bicyclist between the front going vehicle and its own vehicle and to delay the starting motion of its own vehicle if the presence of a pedestrian or a bicyclist is thereby detected.

By a method of merely detecting an obstacle between the front going vehicle and its own vehicle by radar, however, there is still a possibility of a danger. FIG. 1 shows one's own vehicle 2 emitting a detection radar beam 3 towards a front going vehicle 1 to scan its front area but there is a so-called dead zone generated immediately in front. If a pedestrian 4 or a bicyclist enters this zone while the vehicles 1 and 2 are stopped, there is a possibility of failing to detect such an object within the dead zone. Moreover, since the diameter of the detection beam becomes smaller near its own vehicle 2, the reflected light from the object inside the dead zone becomes less likely to be detected reliably. If the object inside the dead zone is a bicycle and the detection beam 3 undergoes a specular reflection (or mirror reflection) by a flat metallic plate at its back, the reflected light is even less likely to be detected. In short, the attempt to detect an object between the two vehicles 1 and 2 by using radar is likely to fail, depending on the position and the condition of the object.

SUMMARY OF THE INVENTION

It is therefore an object of this invention to provide a control device for starting the motion of a mobile body ("the own mobile body") such as a motor vehicle on which it is mounted such that an image obtained by an image-taking device is employed to reliably detect the presence of an object such as a pedestrian or a bicyclist.

A control device according to this invention may make use of a conventional ACC system serving as its distance measuring part for measuring distance to a front going mobile body. Such an ACC system may make use of an optical laser radar (L/R) adapted, for example, to emit near infrared laser light and to receive its reflection. The speed of the own mobile body is controlled such that the distance to the front going mobile body will be constant based on the distance measured by the aforementioned L/R, and as the stopping of the front going mobile body is detected based on a signal from the L/R, a stop control signal for stopping the own mobile body is generated based on the detection of the stopping of the front going mobile body.

In addition to the L/R, there is provided an image-taking device for taking images of the front of the own mobile body. It serves to take images ("a first group of images") until immediately after the stop control part detects the stopping of the front going mobile body and also images ("a second group of images") when the start control part detects the start of the front going mobile body (immediately before or after the starting of the front going mobile body). What are herein referred to as the first image and the second image are respectively selected from the first group of images and the second group of images, and if the first and second images thus obtained do not match, it is concluded that there is an obstacle in front and the own mobile body is prevented from starting to move, that is, what is herein referred to as the start control signal for allowing automatic starting of the own vehicle is inhibited.

With a control thus effected, the presence or absence of an obstacle such as a pedestrian or a two-wheeler between the front going mobile body and the own mobile body can be correctly determined when the front going mobile body stops and starts moving again and to prevent the own mobile body from starting to move when it is judged that such an obstacle is present. In the above, to prevent the own mobile body from starting means to inhibit the output of a signal (the start control signal) for allowing the own mobile body to start moving in a normal way. This means that the own mobile body may be allowed to start moving with a delay or with a less-than-normal acceleration.

In the above, the image of the front of the own mobile body may include images of the road surface in front.

The control device of this invention may further include an illuminator for illuminating the front of the own mobile body when the image-taking device takes an image in front of its own mobile body. The illuminator may be designed such that a light beam with a horizontal spread but with no vertical spread is emitted. With an illuminator of this kind, an image of the front going mobile body showing only the contour of its back side may be obtained. If the aforementioned first and second images are obtained under such a condition, the presence or absence of an obstacle can be more easily determined by comparing them.

According to another embodiment of the invention, the image-taking device is operated to take a third image of the front of the own mobile body when a specified length of time has passed since the starting of the own mobile body is inhibited and this inhibition is removed if the first image and the third image match. With the control thus effected, although a pedestrian may be detected between the front going mobile body and the own mobile body, the own vehicle can be allowed to automatically start its motion when it is detected that the pedestrian is no longer present.

BRIEF DESCRIPTION OF THE DRAWINGS

FIGS. 10A and 10B, together referred to as FIG. 10, show various situations with a ball in front.

DETAILED DESCRIPTION OF THE INVENTION

The invention is described next with reference to FIG. 2 which is a drawing for showing a position for installing a high dynamic range camera (HDRC) 4 used for an ACC system embodying this invention, FIG. 3 which is a plan view for showing the positional relationship between a vehicle provided with such an ACC system and a front going vehicle, FIG. 4 which is its side view and FIG. 5 which is a block diagram of the aforementioned ACC system.

Broadly described, the ACC system of this invention makes uses of a laser radar (L/R) 5 for emitting a near infrared laser beam (the detection beam 3) in a forward direction to measure the distance to a light-reflecting object in front and an image-taking device for obtaining an image of the front of the vehicle on which it is installed (or "the own vehicle" 2). A high dynamic range camera is preferably used as the image-taking device but an ordinary CCD camera may be used for the purpose.

Figure 3:
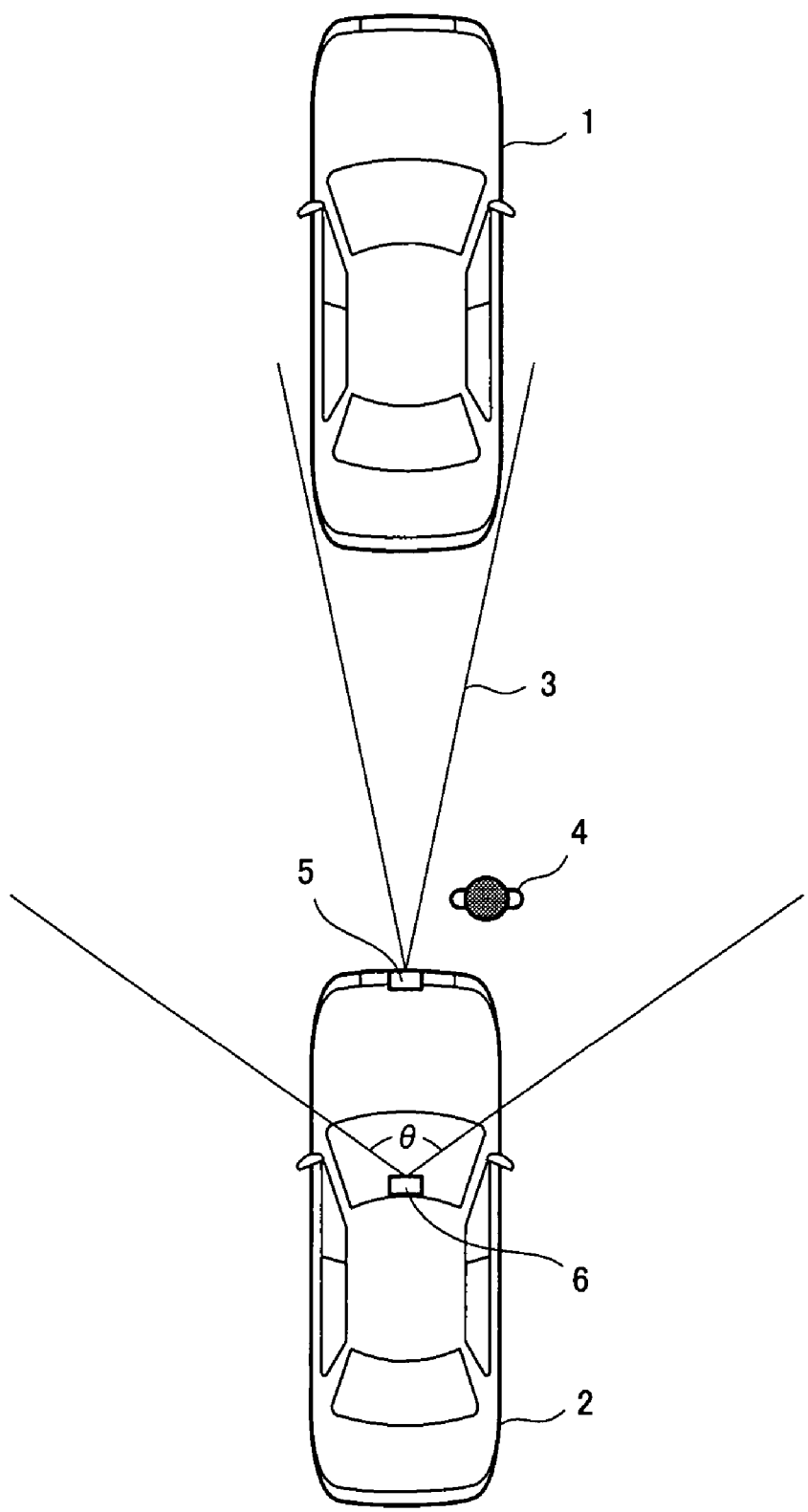
FIG. 3 is a plan view for showing the positional relationship between a vehicle provided with the aforementioned ACC system of this invention and a front going vehicle.
Figure 4:
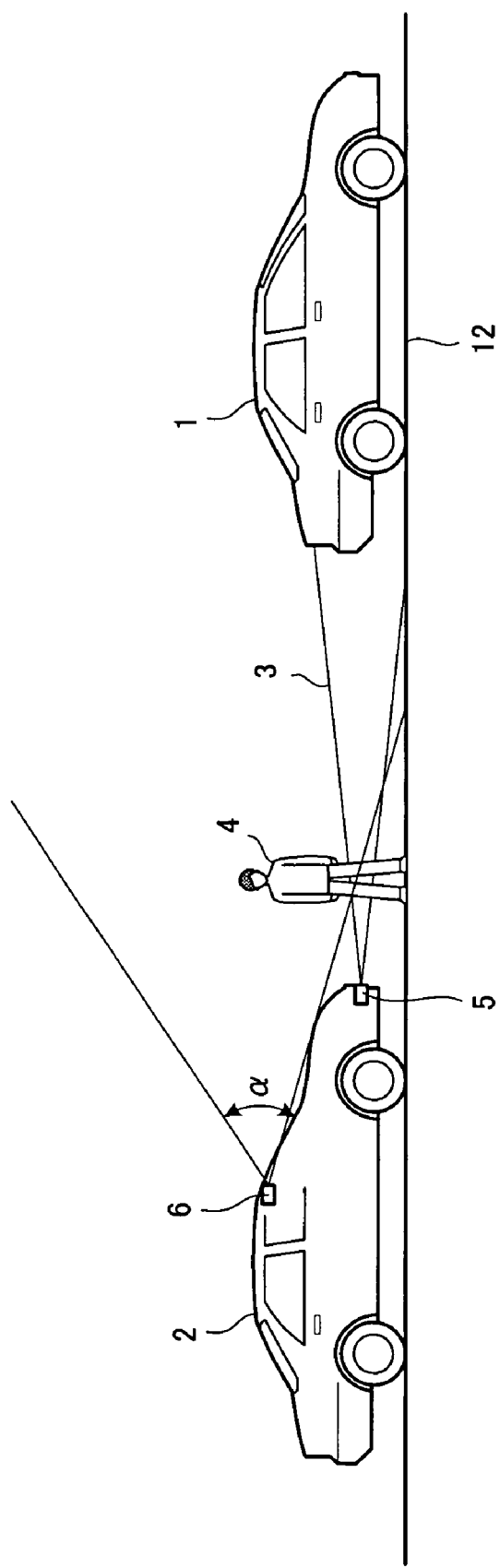
FIG. 4 is a side view for showing the positional relationship between the vehicles shown in FIG. 3.

As shown in FIGS. 3 and 4, the laser radar 5 is installed at a convenient position in front of the own vehicle (such as where the bumper is) for scanning the front area horizontally with the detection beam 3. The detection beam 3 is formed as a vertically elongated beam with an appropriate spread angle such that its extension in the vertical direction increases as the bean propagates. In this manner, a front going vehicle 1 at a distance in the range of a few meters to a few tens of meters can be reliably irradiated. The laser radar 5 is adapted to receive the reflected beam and to determine the distance to the front going vehicle 1 by measuring the time required by the emitted beam to reach it.

Figure 1:
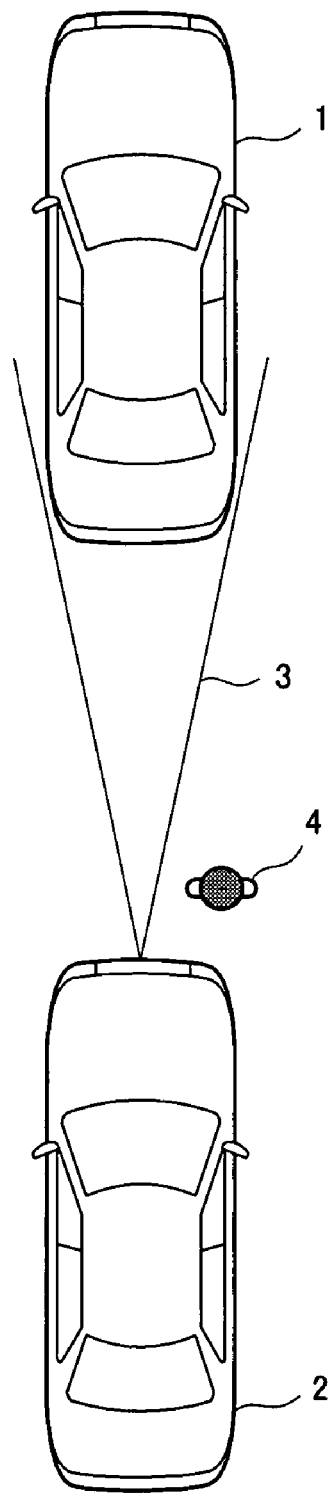
FIG. 1 is a plan view for showing the positional relationship between a vehicle provided with a conventional ACC system and a front going vehicle.
Figure 2:
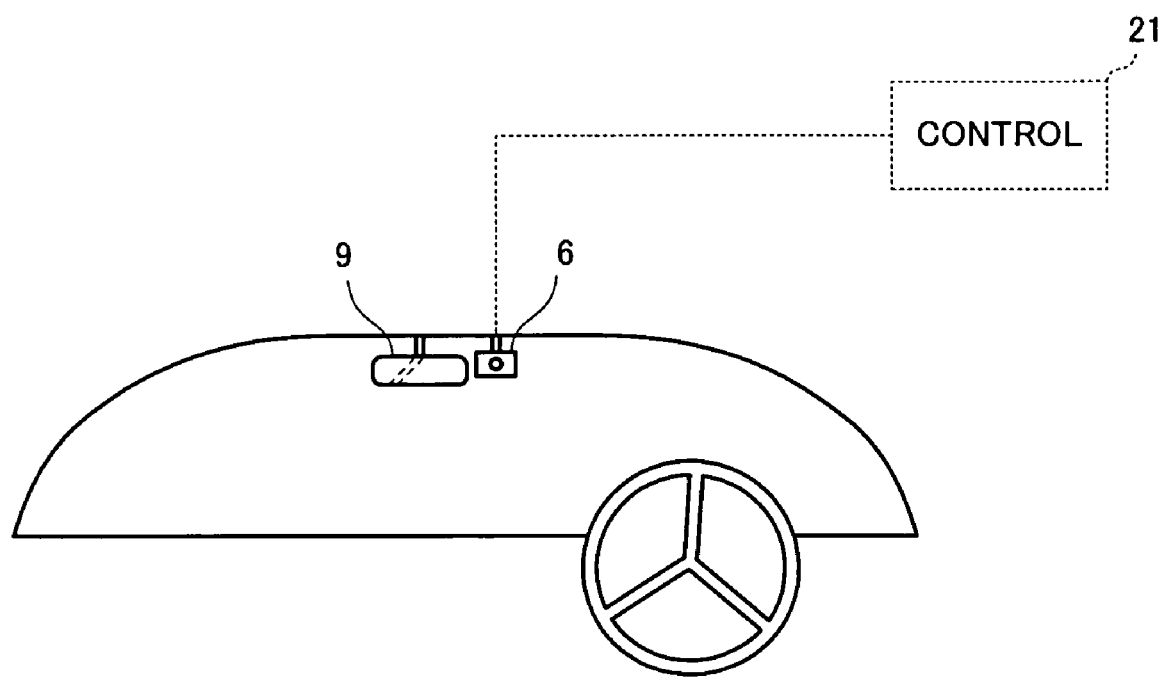
FIG. 2 is a drawing for showing a position for installing a high dynamic range camera (HDRC) used for an ACC system embodying this invention.

As shown in FIG. 2, the HDRC 6 is set next to the room mirror 9 of the own vehicle 2. The horizontal image angle $\theta$ of this HDRC 6 is selected to be large enough as shown in FIG. 3 to cover a horizontal distance of the front of the own vehicle 2. In other words, all objects that may exist between the front going vehicle 1 and the own vehicle 2 are included within this image angle $\theta$.

The spread of the detection beam 3 from the laser radar 5 in the vertical direction is shown in FIG. 4 such that the back portions of the front going vehicle can be reliably irradiated and the reflected light therefrom can be reliably received.

The image angle $\alpha$ of the HDRC 6 in the vertical direction is determined such that an image of the front of the own vehicle 2 with a maximum vertical length can be obtained from the position next to the room mirror 9 where it is installed as shown in FIG. 2. Thus, all objects that are between the front going vehicle 1 and the own vehicle 2 in the vertical direction are included within this image angle $\alpha$.

Figure 5:
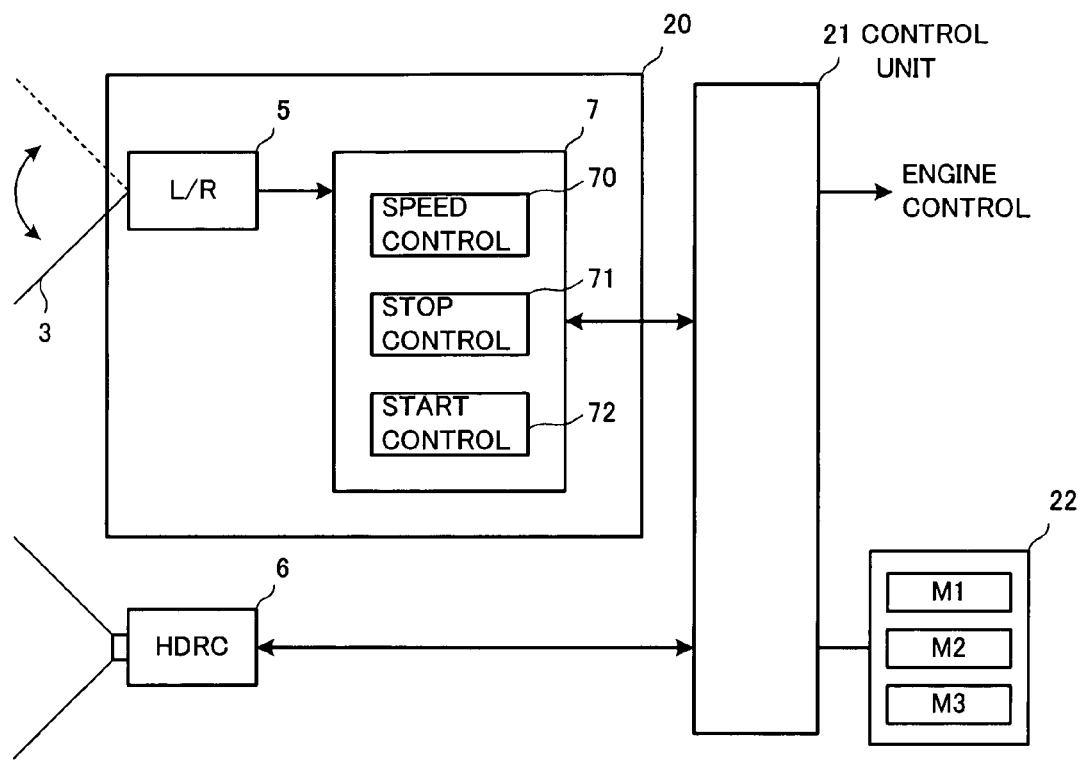
FIG. 5 is a block diagram of the aforementioned ACC system of this invention.

As shown in FIG. 5, the ACC system is comprised of a laser radar (L/R) system 20 that includes a laser radar (L/R) control unit 7 in addition to the laser radar (L/R) 5, the HDRC 6, a control unit 21 for the control of the whole, and an image memory 22. The L/R control unit 7 according to the presently illustrated example includes a speed control part 70, a stop control part 71 and a start control part 72. The speed control part 70, the stop control part 71 and the start control part 72, however, need not be provided within the L/R system 20. They may instead be provided to the control unit 21 or independently. The image memory 22 is provided with an area for storing a first image M1, another area for storing a second image M2 and still another area for storing a third image M3.

The control unit 21 is connected to the L/R system 20, the HDRC 6 and the image memory 22 and is adapted not only to control them but also to output signals for controlling the speed of the own vehicle 2, stopping it and starting its motion.

The speed control part 70 is for forming signals, based on the distance measured by the HDRC 6 between the front going vehicle 1 and the own vehicle 2, for controlling the speed of the own vehicle 2 such that the distance to the front going vehicle 1 remains a constant. The stop control part 71 is for detecting the stopping of the front going vehicle 1, based on the distance measured by the HDRC 6 between the front going vehicle 1 and the own vehicle 2, and serves to form a stop control signal for the own vehicle 2, based on the detected stopping of the front going vehicle 1. The start control part 72 is for detecting the starting of the front going vehicle 1, based on the distance measured by the HDRC 6 between the front going vehicle 1 and the own vehicle 2, and serves to form a start control signal for the own vehicle 2, based on the detected starting of the front going vehicle 1. The starting of the front going vehicle 1 may be detected when the measured distance or the acceleration of the front going vehicle 1 exceeds a certain threshold value.

The signals generated by the L/R control unit 7 are transmitted to the control unit 21 and further therefrom to vehicle control parts (not shown) for controlling the engine and the braking based on these received signals.

The HDRC 6 serves to obtain images in front at an appropriate timing based on signals from the control unit 21. For example, the HDRC 6 may be activated at uniform intervals until the stopping of the front going vehicle 1 is detected by the stop control part 71 while the speed of the own vehicle 2 is controlled by the speed control part 70 such that the distance between the two vehicles 1 and 2 remains a constant, obtaining the images of the front of the own vehicle 2. An image of the front of the own vehicle 2 may also be obtained immediately after the stop control part 71 detects the stopping of the front going vehicle 1. These images may be averaged or the last image to be obtained may be selected to be stored as the first image M1 in the image memory 22.

The HDRC 6 also serves to obtain an image of the front of the own vehicle 2 immediately before after the starting of the front going vehicle 1 is detected by the start control part 72 and to save it in the memory 22 as the second image M2. An image immediately before the detection of the starting of the front going vehicle 1 may be obtained by obtaining images of the front of the own vehicle 1 at constant intervals and selecting later the one immediately before the detection of the starting of the front going vehicle 1.

The start control part 72 further serves to compare the first and second images M1 and M2 stored in the memory 22. If they do not match, it is concluded that there is an object such as a pedestrian or a bicycle in front of the own vehicle 2 and no start control signal is outputted to the control unit 21. In other words, the start control part 72 serves to prevent the transmission of the start control signal formed for the own vehicle 2 on the basis of the detection of the starting of the front going vehicle 1. Thus, the control unit 21 is prevented from outputting the signal for starting the own vehicle 2 to the vehicle control part.

Thus, as the front going vehicle 1 starts to move from the condition where both the front going vehicle 1 and the own vehicle 2 are stopped, if a pedestrian or a two-wheeler has entered the space in between in the meantime, the own vehicle 2 can be prevented from automatically starting its motion.

In the above, if the images M1 and M2 match, the own vehicle 2 is allowed to automatically start its motion based on the start control signal formed by the start control part 72.

When a specified length of time has elapsed after the start control signal is thus made invalid by the ACC system, the HDRC 6 obtains a new image of the front and the image is stored as the third image M3 in the image memory 22. From this time on, the HDRC 6 obtains a new image every time this specified length of time elapses and updates the third image M3. The start control part 72 serves to periodically compare the third image M3 with the aforementioned first image M1 and, if they match, the constraint on the start control signal is removed and it is outputted to the control unit 21. In other words, although there was a pedestrian, for example, between the front going vehicle 1 and the own vehicle 2 when the front going vehicle was starting to move, if the pedestrian is gone and this is detected, the own vehicle 2 can be allowed to automatically start moving.

Figure 6:
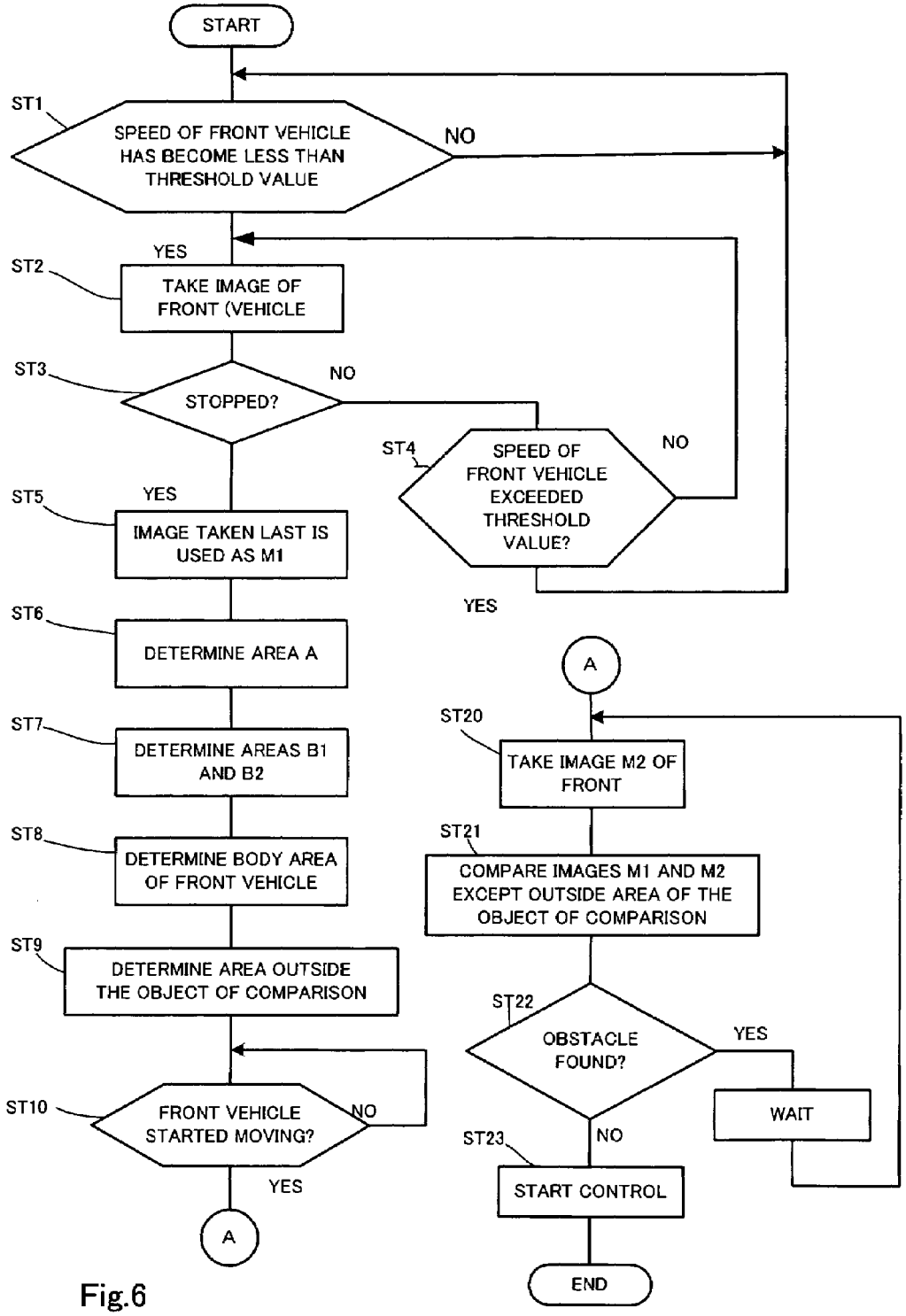
FIG. 6 is a flowchart of the ACC system of FIG. 5.

FIG. 6 is a flowchart of the process described above. As the speed of the front going vehicle 1 is detected to have become less than a specified level (YES in Step ST1), an image of the front is obtained by the HDRC 6 (Step ST2), and this is continued until the stop control part 71 detects the stopping of the front going vehicle 1 unless the speed of the front going vehicle 1 exceeds the specified level. If the front going vehicle stops (YES in Step ST3), the image that was most previously obtained is stored as the first image M1 in the memory 22 (Step ST5).

Next, areas for detecting objects such as pedestrians are set (Steps ST6 and ST7). According to the present example, an area directly in front (referred to as Area A) and an adjacent area (referred to as Area B) thereto are set.

If entry of an object such as a pedestrian into the space between the front going vehicle 1 and the own vehicle 2 within the field of vision of the camera is to be detected from the difference between images taken at two different times ("before" and "after"), it is desirable from the point of view of the processing speed to select an area as small as necessarily possible such as the area between the front end of the own vehicle 2 and the back end of the front going vehicle 1. If only this area were considered, however, it would not be possible to detect objects that are about to enter but not yet within this space between the two vehicles 1 and 2. For this reason, it is preferable to include both areas indicated as B1 and B2 in FIG. 7A on both right and left hand sides of Area A directly in front.

It is further preferable to include a body portion of the front going vehicle itself because when an object such as a pedestrian passes in front of the own vehicle, it is likely that a portion of the body part of the front going vehicle is covered by it. It is preferable, on the other hand, to exclude the window portion of the front going vehicle because if there is a change in the scenery in front seen through such a window, this will also result in a differential, and one may come to falsely conclude that there was a differential in the scenery and hence that there was an object such as a pedestrian passing in front. Parts that are farther away than or aside from the front going vehicle are also similar. The part corresponding to the front hood (or bonnet) of the own vehicle may also be excluded because objects of interest such as pedestrians do not pass thereon.

Figure 7A:
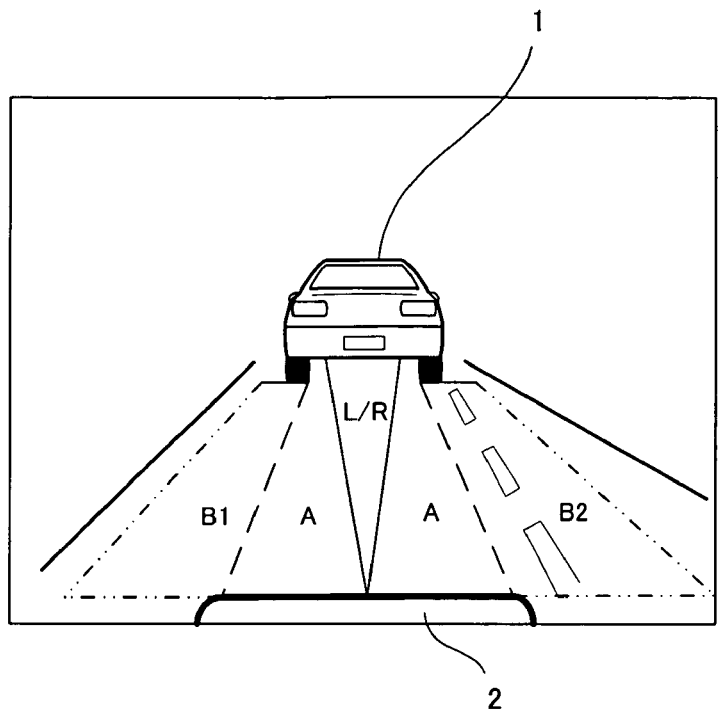
FIGS. 7A and 7B are drawings that show photographed areas.

FIG. 7A shows Area A which is directly in front and Area B (including Areas B1 and B2). Area L/R indicates the detection area of the L/R 5. Area A is the most important area to watch, and Areas B1 and B2 are areas that are next most important to watch. They may extend sideways to the positions of lane markers detected by the function for detecting line markers or by a predetermined width. It is preferable to use a preliminarily determined width because the width of detection would depend on the position of the own vehicle if the position of detected lane marker were used.

Figure 7B:
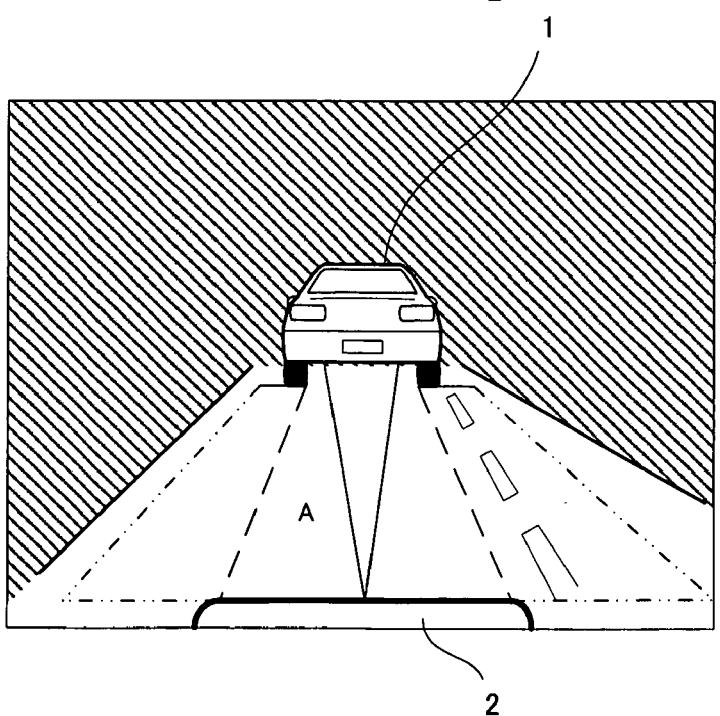

Next, processes for eliminating portions that are unrelated to the detection of objects (such as the shaded portion of FIG. 7B) are carried out. In Step ST8, the portion corresponding to the body of the front going vehicle 1 is determined. In Step ST9, the area outside the object of comparison is determined.

As the start control part 72 detects that the front going vehicle 1 has started to move (YES in Step ST10), an image of the front is obtained immediately afterwards as the second image M2 (Step ST20). Next, the first and second images M1 and M2 are compared after the areas outside the object of comparison are removed from both of them (Step ST21). In the above, the brightness of the brake light in the first image M1 and that after the second image M2 was taken are compared and if they are about the same, the comparison as described above is carried out but if they are different, the second image M2 may be obtained again. In this way, differences due to the brake light or the directional light can be reduced and the accuracy of comparison improves.

Alternatively, the comparison may be made by masking the portions of the brake lights and directional lights of the front going vehicle 1. This method is advantageous in that it becomes unnecessary to pay attention to the lighting condition of these lamps and to wait until the same conditions are established. Even if these lights are masked, the lamp in a switched-on condition may be reflected by the road surface especially at night or in rain and this may cause a differential. In view of this possibility, it may be arranged to illuminate the environment of the front going vehicle when an image is taken, as illustrated in FIG. 8.

Figure 8:
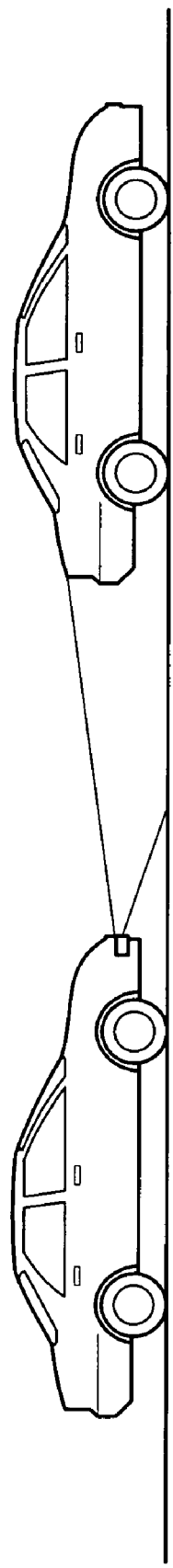
FIG. 8 is a side view showing illumination of a front area.

Still another possible method is to mask the back lamps of the front going vehicle and also to illuminate the front as shown in FIG. 8 so as to further reduce the effects of the lights from the front going vehicle as well as from lights elsewhere.

Figure 9A:
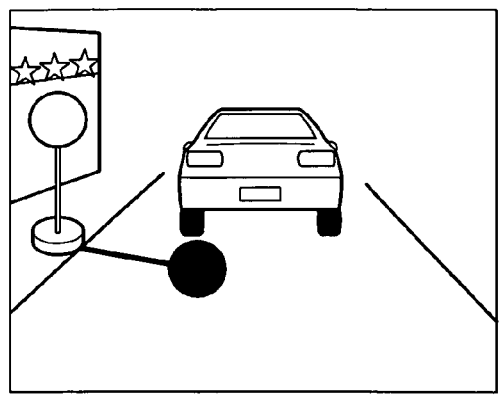
FIGS. 9A, 9B, 9C and 9D, together referred to as FIG. 9, show various effects of a shadow.
Figure 9B:
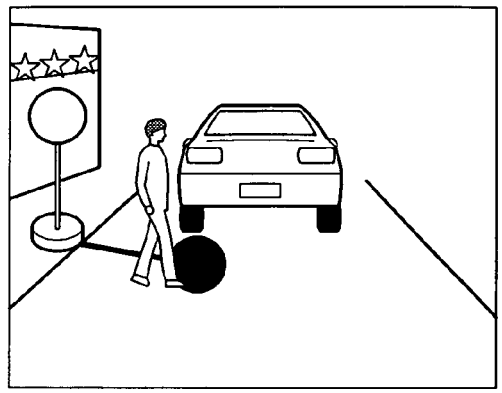
Figure 9C:
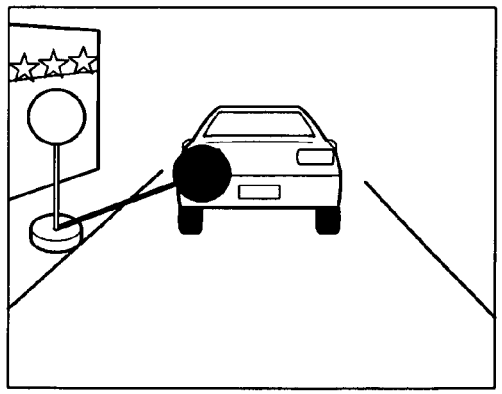
Figure 9D:
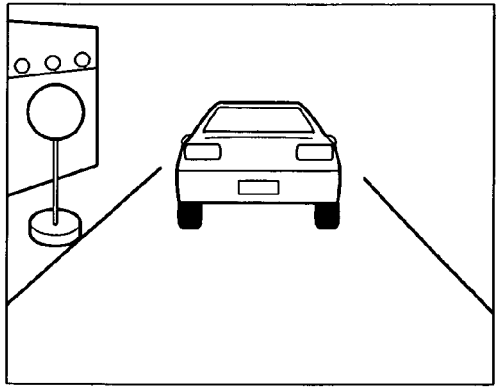

Advantages of providing illumination as shown in FIG. 8 include elimination of effects of external disturbances caused by blinking lights on nearby buildings as well as shadows that may be caused to appear and disappear by such blinking lights. FIG. 9A shows a situation where a shadow of a roadside object cast on the road surface, FIG. 9B shows the same shadow in the further presence of a pedestrian, FIG. 9C shows the same shadow now on the body of the front going vehicle, and FIG. 9D shows the situation after the shadow has disappeared because the lights causing the shadow have been switched off. External disturbances caused by appearance and disappearance of such a shadow can also be easily eliminated by the illumination method shown by FIG. 8. For the purpose of such illumination, it is preferable to use light in a wavelength range that can be registered by the camera but not visible to the human. The light source for this purpose may be separately installed in the front part of the vehicle or incorporated as a part of the LED headlight.

If a circular area is present among the differentials in the detected image, it is assumed to be due to the appearance of a ball and the differential detection is continued. If the same circular differential area continues to be detected, it is judged to be indeed a ball and the output of the start control signal is control by preventing the output, delaying the output or reducing the acceleration of the starting motion in view of the possibility that a child may suddenly appear in the scene to chase after the ball. FIG. 10A shows a scene as a ball may first be detected and FIG. 10B shows the ball in the midst of being thus traced as explained above.

Figure 11:
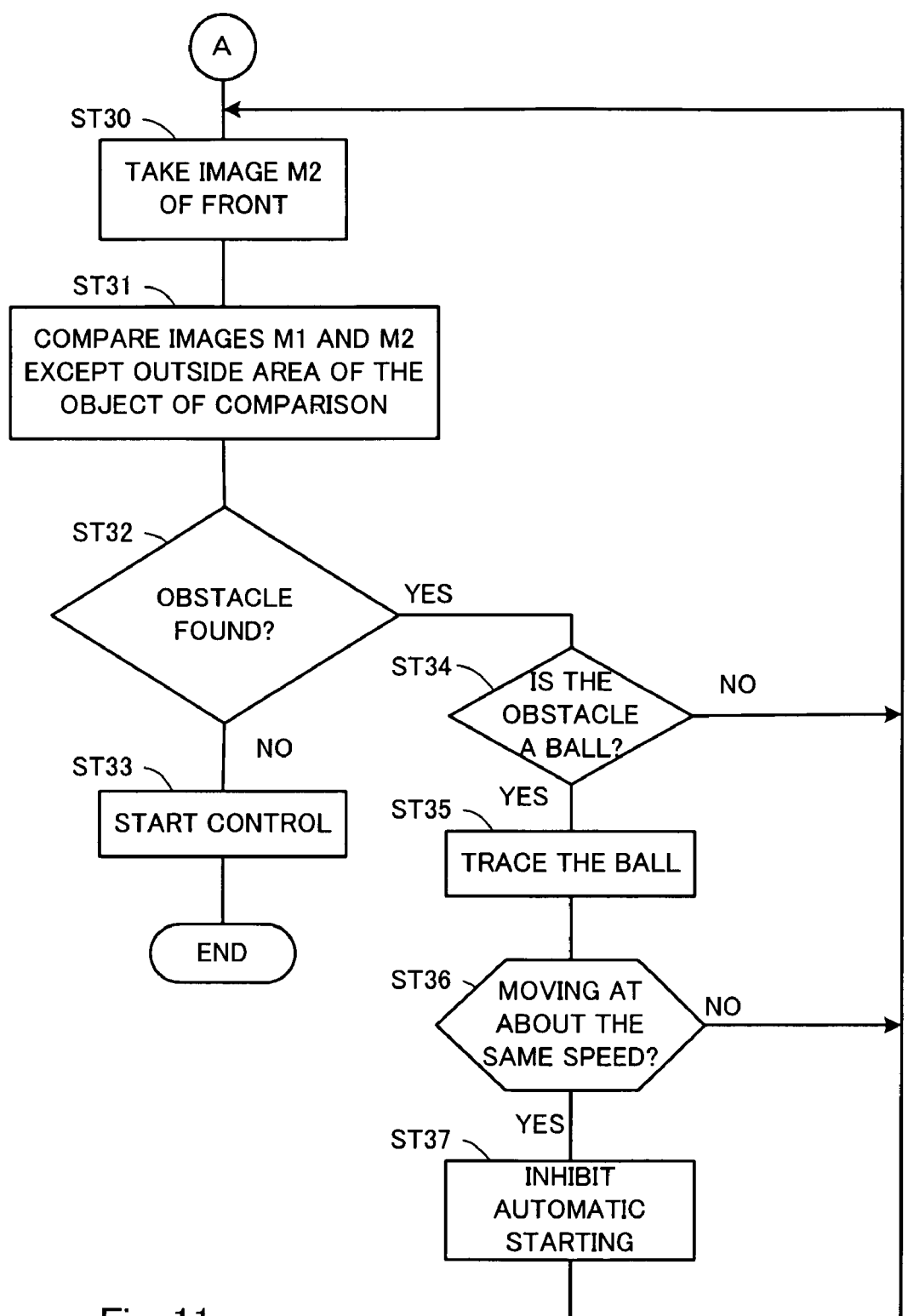
FIG. 11 is a flowchart of a process when a ball is detected.
Figure 12:
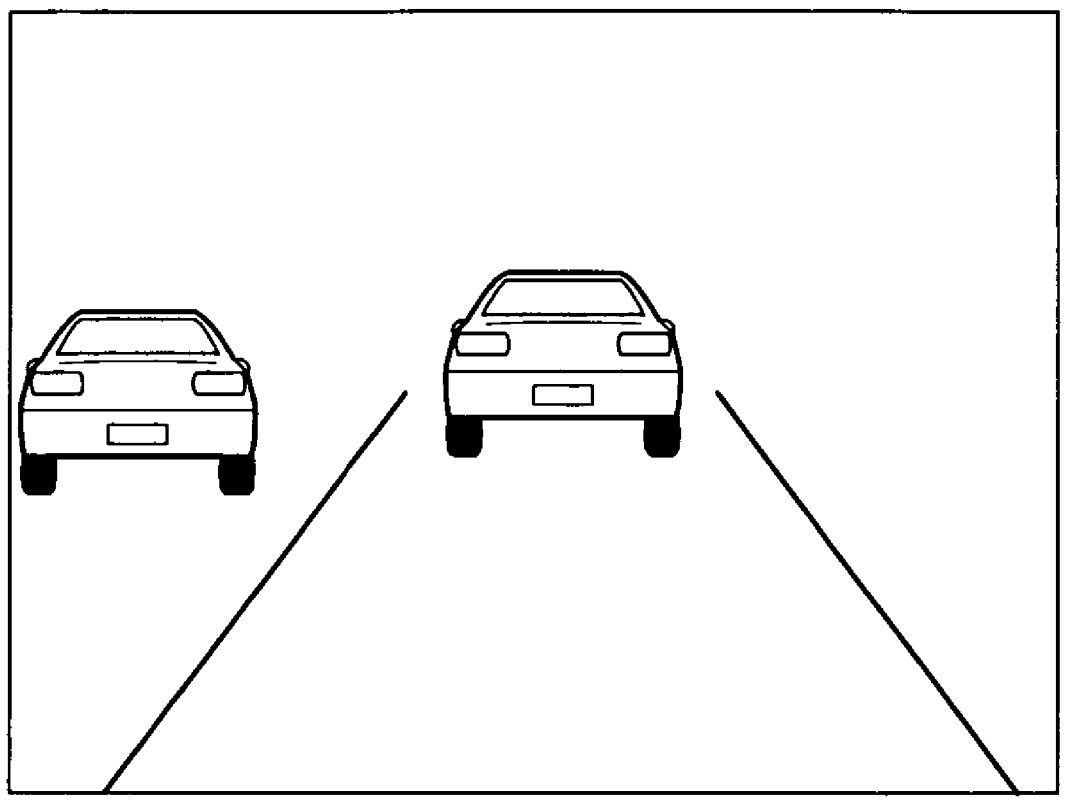
FIG. 12 shows a view in a situation where there is a vehicle in a neighboring lane.

FIG. 11 is a flowchart for the process when a ball is detected as explained above.

After an image (the second image M2) of the front is obtained (Step ST30) and it is compared with the earlier obtained first image (Step ST31), it is determined whether a differential representing an object is present (Step ST32) (as in Steps ST20, ST21 and ST22 in the flowchart of FIG. 6). If the detected object is circular and determined to be a ball (YES in Step ST34), it is traced, that is, its detection is continued (Step ST35). If it is found to keep moving at about the same speed (YES in Step 36), it is judged not to be an external disturbance and the automatic starting of the vehicle is inhibited (Step ST37). Even where the ball is not undergoing a motion nearly at a constant speed, the automatic starting may still be inhibited if the object is repeating a parabolic motion because it may be concluded therefrom that it is a bounding ball. In the above, to inhibit the automatic starting may mean either delaying the starting or reducing the acceleration in the starting motion.

If no differential as an object is detected (NO in Step ST32), the full start control is carried out, allowing the vehicle to start its normal motion (Step ST33).

If a new vehicle comes to stop in a neighboring traffic lane while the own vehicle is stopped, a difference appears between the first image M1 taken at the time of stopping and the second image M2 taken when the front going vehicle started its motion either in the left-hand front part (Area B1) or in the right-hand front part (Area B2) of the own vehicle 2, and this may prevent the own vehicle from starting until this newly stopped vehicle in the next lane also starts to move. This is a trouble not only to oneself but also to the drivers of the vehicles that are behind. Thus, if an object appears in the area on the front right-hand or left-hand side of the own vehicle 2, the direction of its motion is detected and if its motion is found to be in the same forward direction (as the own vehicle), it is not treated as an obstacle. The direction of the motion of the object can be determined by the so-called optical flow method that is commonly used in image processing. In this case, since the vehicle that appears in the next lane is not judged as an obstacle, the first image M1 need not be updated but there may be a pedestrian who is waiting in front of the own vehicle for the vehicle in the next lane to stop or pass. If the first image M1 is wholly updated in this situation, it may be incorrectly concluded that there is no obstacle in front. In order to avoid this possibility, it may be arranged such that only the portion of the image (M1) corresponding to the right-hand or left-hand side (Area B1 or B2) will be updated. In this manner, the pedestrian who is actually in front of the own vehicle 2 is correctly identified as an obstacle even after the first image M1 is updated.

Figure 13:
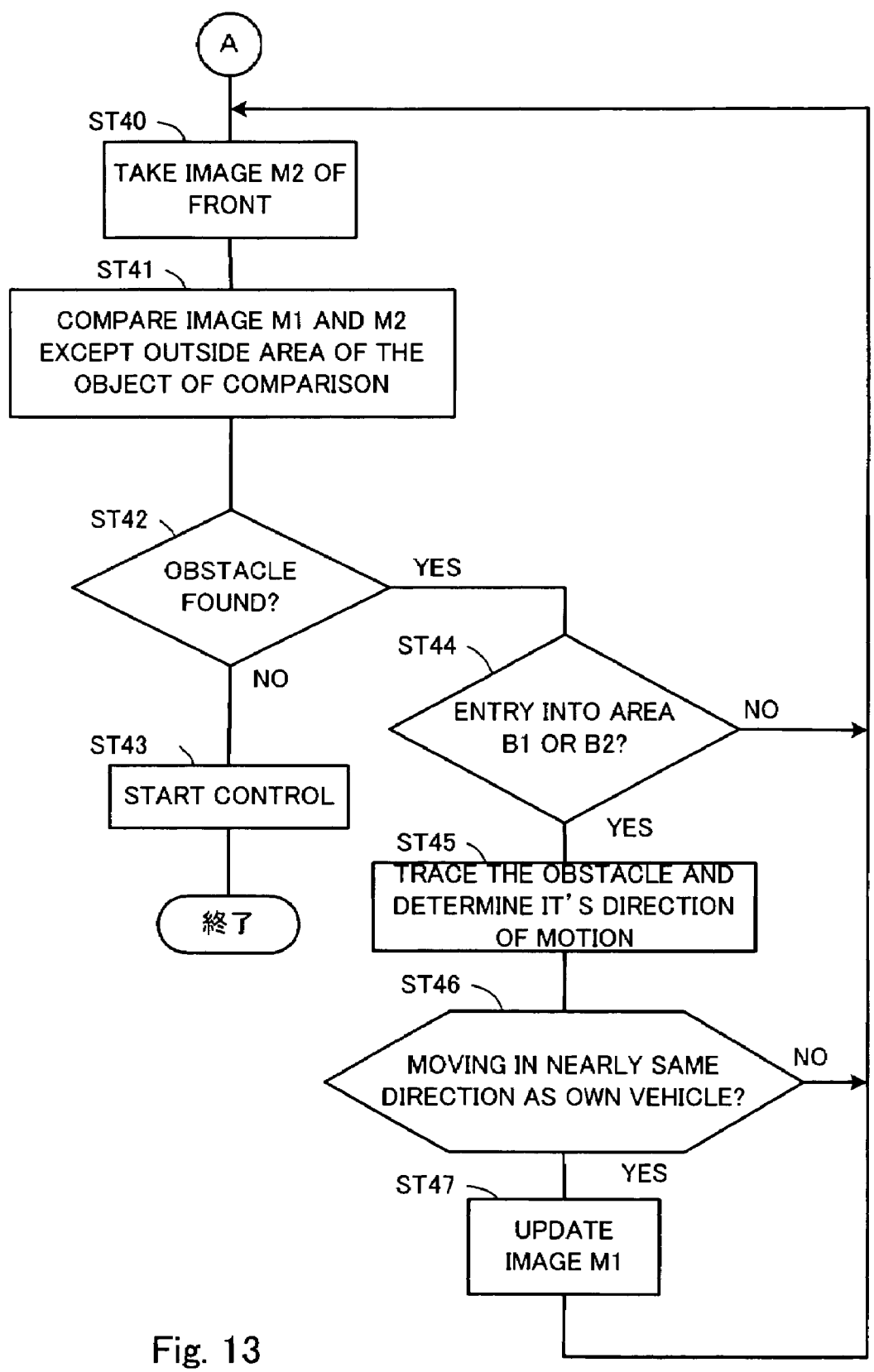
FIG. 13 is a flowchart of a process when there is a vehicle in a neighboring lane.

FIG. 13 shows the processing when a vehicle appears in a neighboring lane. In the flowchart of FIG. 13, Steps ST40, ST41 and ST42 are respectively the same as Steps ST30, ST31 and SDT32 of FIG. 11. Next, if it is determined that an object has entered the area on the front right-hand and left-hand side (Area B1 or B2) (YES in Step ST44), it is traced and the direction of its motion is determined (Step ST45). If it is determined to be approximately the same as the forward direction (in which the own vehicle is progressing) (YES in Step ST46), the first image M1 is updated (Step ST47) because it may be concluded to be another vehicle in the next lane. In this manner, the own vehicle 2 can be safely started even where a ball is sighted in front or another vehicle appears in a next lane.

Figure 14:
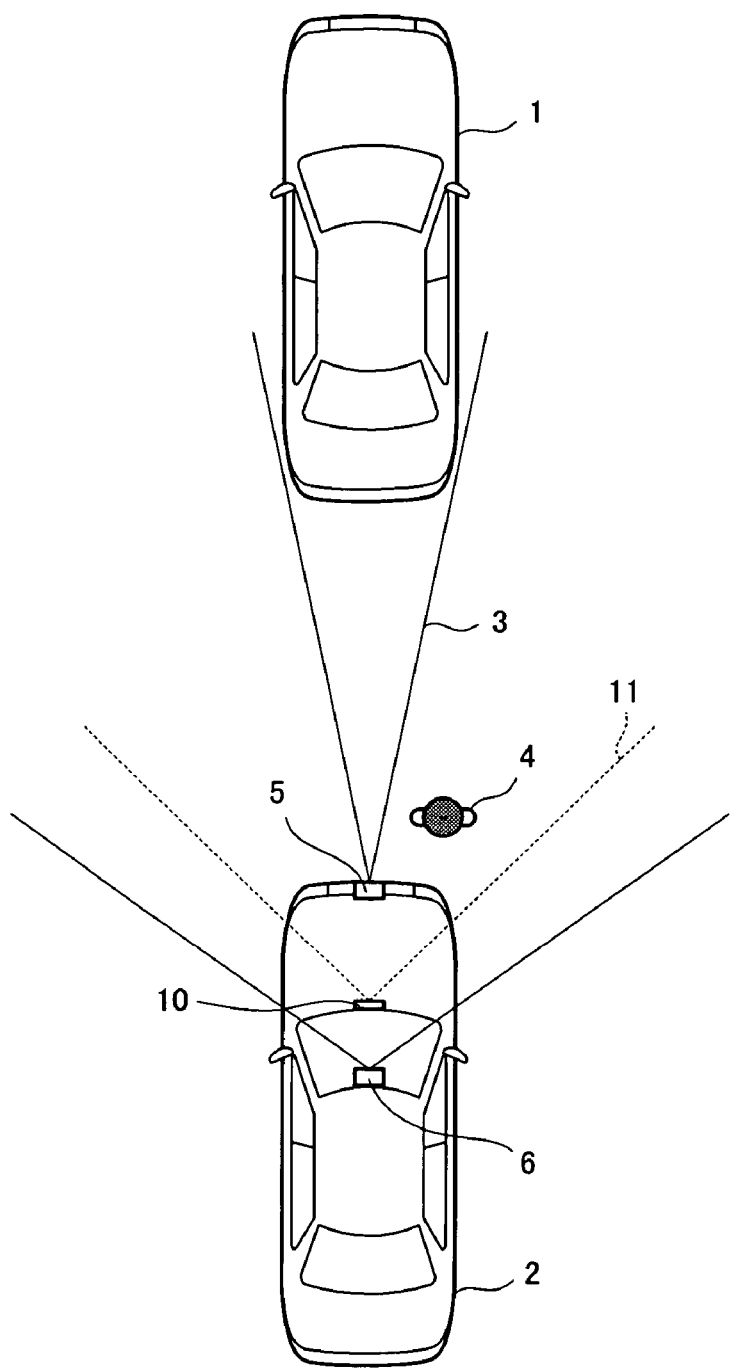
FIG. 14 is a plan view for showing the positional relationship between a vehicle provided with another ACC system of this invention and a front going vehicle.
Figure 15:
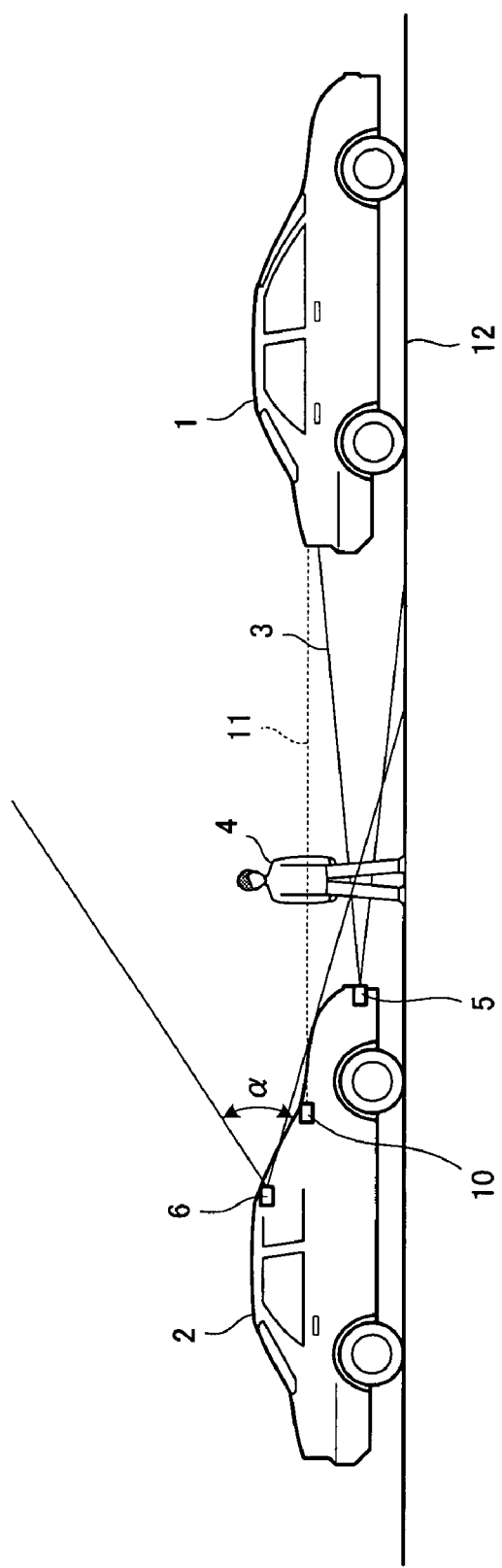
FIG. 15 is a side view for showing the positional relationship between the vehicles shown in FIG. 14.

FIGS. 14 and 15 are respectively a plan view and a side view for showing the positional relationship between a vehicle provided with another ACC system of this invention and a front going vehicle. This ACC system is characterized as additionally having an illuminator 10 for emitting near-infrared light 11 in the form of a beam having a spread in the horizontal direction as shown in FIG. 14 but with no spread in the vertical direction as shown in FIG. 15. As such a beam is emitted towards the front going vehicle 1, the HDRC 6 will capture only the contour of its back part. If there is an object such as a pedestrian 4 within the space between the front going vehicle 1 and the own vehicle 2, the light hitting such a pedestrian will also be recorded such that its existence can be easily detected from the obtained image. This is a known method referred to as the light section method.

In the above, if the wavelength of the infrared light 11 is close to that of the laser light from the L/R 5, there is a possibility of interference and care should be taken, for example, by differentiating the timing of emission from them. It is also possible to carry out the illumination by the illuminator 10 in an intermittent manner to compare the images taken by the HDRC 6 when the illuminator 10 was on and when it was off, obtaining a differential and thereby extracting the shape of the object such as the pedestrian 4.

The invention has been described above with reference to only a limited number of examples but they are not intended to limit the scope of the invention. Many modifications and variations are possible within the scope of the invention. Although the HDRC 6 has been described above as obtaining images of the back part of the front going vehicle 1, an image of the road surface (indicated by numeral 12 in FIG. 4) between the front going vehicle 2 and the own vehicle 1 may be obtained when the front going vehicle 1 has stopped. In such a situation, aforementioned first, second and third images M1, M2 and M3 each become an image of the road surface but, as shown in FIGS. 4 and 7, the image of any obstacle that may come to appear in the space between the vehicles 1 and 2 will be more easily detected.

The dynamic range of the input signals to the HDRC 6 described above with reference to the examples is much larger that that of a conventional CCD camera. Thus, it is possible to thereby obtain both a bright reflected image and a dark reflected image (say, of the road surface) at the same time. This makes it easier to detect the presence of an obstacle even at night when the headlights are on.

It goes without saying that the present invention is applicable also to mobile bodies of other types such as ships and aircrafts in addition to motor vehicles.

What is claimed is:

1. A control device for starting motion of an own mobile body, said control device comprising:
    a distance measuring part for measuring distance to a front going mobile body;
    a speed control part for controlling the speed of said own mobile body such that distance to said front going mobile body will be constant based on said measured distance measured by said distance measuring part;
    a stop control part for detecting stopping of said front going mobile body based on said measured distance measured by said distance measuring part and generating a stop control signal for said own mobile body based on the detecting of the stopping of said front going mobile body;
    a start control part for detecting a start of said front going mobile body based on said measured distance measured by said distance measuring part and generating a start control signal for said own mobile body based on the detecting of the start of said front going mobile body; and
    an image-taking device for taking a first group of images of the front of said own mobile body until immediately after said stop control part detects the stopping of said front going mobile body and a second group of images of the front of said own mobile body when said start control part detects the start of said front going mobile body, a first image being selected from said first group of images and a second image being selected from said second group of images;
    wherein said start control part serves to inhibit said start control signal by concluding that there is an object in front of said own mobile body if said first image and said second image do not match.

2. The control device of claim 1 wherein said image-taking device serves to take images of the road surface in front of said own mobile body.

3. The control device of claim 1 further comprising an illuminator that illuminates the front of said own mobile body when said image-taking device takes an image of said front of said own mobile body.

4. The control device of claim 1 wherein said image-taking device serves to take a third image of the front of said own mobile body when a specified length of time has passed since said start control signal is inhibited, and wherein said start control part serves to remove the inhibition of said start control signal if said first image and said third image match.

5. The control device of claim 2 wherein said image-taking device serves to take a third image of the front of said own mobile body when a specified length of time has passed since said start control signal is inhibited, and wherein said start control part serves to remove the inhibition of said start control signal if said first image and said third image match.

6. The control device of claim 3 wherein said image-taking device serves to take a third image of the front of said own mobile body when a specified length of time has passed since said start control signal is inhibited, and wherein said start control part serves to remove the inhibition of said start control signal if said first image and said third image match.

* * * * *